US012700008B2

(12) United States Patent
Ma et al.

(10) Patent No.: US 12,700,008 B2
(45) Date of Patent: Aug. 4, 2026

(54) SYSTEMS AND METHODS FOR DETERMINING SOFTWARE CARBON EMISSIONS

(71) Applicant: World Wide Technology Holding Co., LLC, Maryland Heights, MO (US)

(72) Inventors: Yuhang Ma, Jersey City, NJ (US); Vinay Garg, Uttam Nagar (IN); Christopher Matthew Brozyna, Saint Louis, MO (US); Nitasha Nair, Chicago, IL (US); Ashley Elisabeth Degen, Denver, CO (US); Leah Renee Ellis-Clemons, Minneapolis, MN (US); Kathryn Costigan Heyel, Wildwood, MO (US); Brendan Gerard Walsh, New York, NY (US); Wesley Warren Palmer, Philadelphia, PA (US); Harcharan Singh Kabbay, Wildwood, MO (US)

(73) Assignee: WORLD WIDE TECHNOLOGY HOLDING CO., LLC, Maryland Heights, MO (US)

( * ) Notice: Subject to any disclaimer, the term of this patent is extended or adjusted under 35 U.S.C. 154(b) by 0 days.

(21) Appl. No.: 18/807,259

(22) Filed: Aug. 16, 2024

(65) Prior Publication Data

US 2026/0050931 A1    Feb. 19, 2026

(51) Int. Cl.
*G06Q 50/06* (2024.01)
*G06F 11/30* (2006.01)
(Continued)

(52) U.S. Cl.
CPC .................................. *G06Q 30/018* (2013.01)

(58) Field of Classification Search
CPC .................................................. G06Q 30/018
See application file for complete search history.

(56) References Cited

U.S. PATENT DOCUMENTS

2009/0281846 A1    11/2009    Rose
2010/0191998 A1     7/2010    Moore
(Continued)

FOREIGN PATENT DOCUMENTS

CN    106483876 A    3/2017
CN    114138095 A    3/2022
CN    115358859 A    11/2022

OTHER PUBLICATIONS

Davy, B. Evaluating the Carbon Footprint of a Software Platform Hosted in the Cloud, Teads Engineering, medium.com/teads-engineering/evaluating-the-carbon-footprint-of-a-software-platform-hosted-in-the-cloud-e716e14e060c 2020.

*Primary Examiner* — Maroun P Kanaan
(74) *Attorney, Agent, or Firm* — BRYAN CAVE LEIGHTON PAISNER LLP

(57) ABSTRACT

A method or system that includes determining a functional boundary for a software application; determining a functional unit for the software application; receiving an energy consumption measurement for the software application; receiving a location-based marginal carbon emissions measurement for the software application; determining a hardware emissions measurement for the software application; determining a lifespan emissions measurement for the software application; and determining a software carbon emissions measurement for the software application based at least on the functional boundary, the functional unit, the energy consumption measurement, the location-based marginal carbon emissions measurement, the hardware emissions measurement, or the lifespan emissions measurement. Other embodiments are described.

16 Claims, 9 Drawing Sheets

(51) Int. Cl.
    *G06Q 30/00*       (2023.01)
    *G06Q 30/018*    (2023.01)

(56)          References Cited

U.S. PATENT DOCUMENTS

| | | | |
|---|---|---|---|
| 2011/0145621 | A1 | 6/2011 | Albano |
| 2011/0246987 | A1 | 10/2011 | Diwakar |
| 2013/0247059 | A1 | 9/2013 | Amsterdam |
| 2020/0003812 | A1 | 1/2020 | Gross |
| 2020/0133702 | A1 | 4/2020 | Sharma |
| 2021/0342185 | A1 | 11/2021 | Naidu |
| 2022/0011843 | A1 | 1/2022 | MacNamara |
| 2022/0071046 | A1 | 3/2022 | Chapel |
| 2022/0108252 | A1 | 4/2022 | Narasimhan |
| 2022/0398515 | A1 | 12/2022 | McGuire |
| 2024/0112199 | A1* | 4/2024 | Sudakovitch ........ G06Q 30/018 |
| 2024/0127264 | A1* | 4/2024 | Nguyen ................ H04L 63/107 |
| 2024/0281826 | A1* | 8/2024 | Mallet ................. G06Q 30/018 |

* cited by examiner

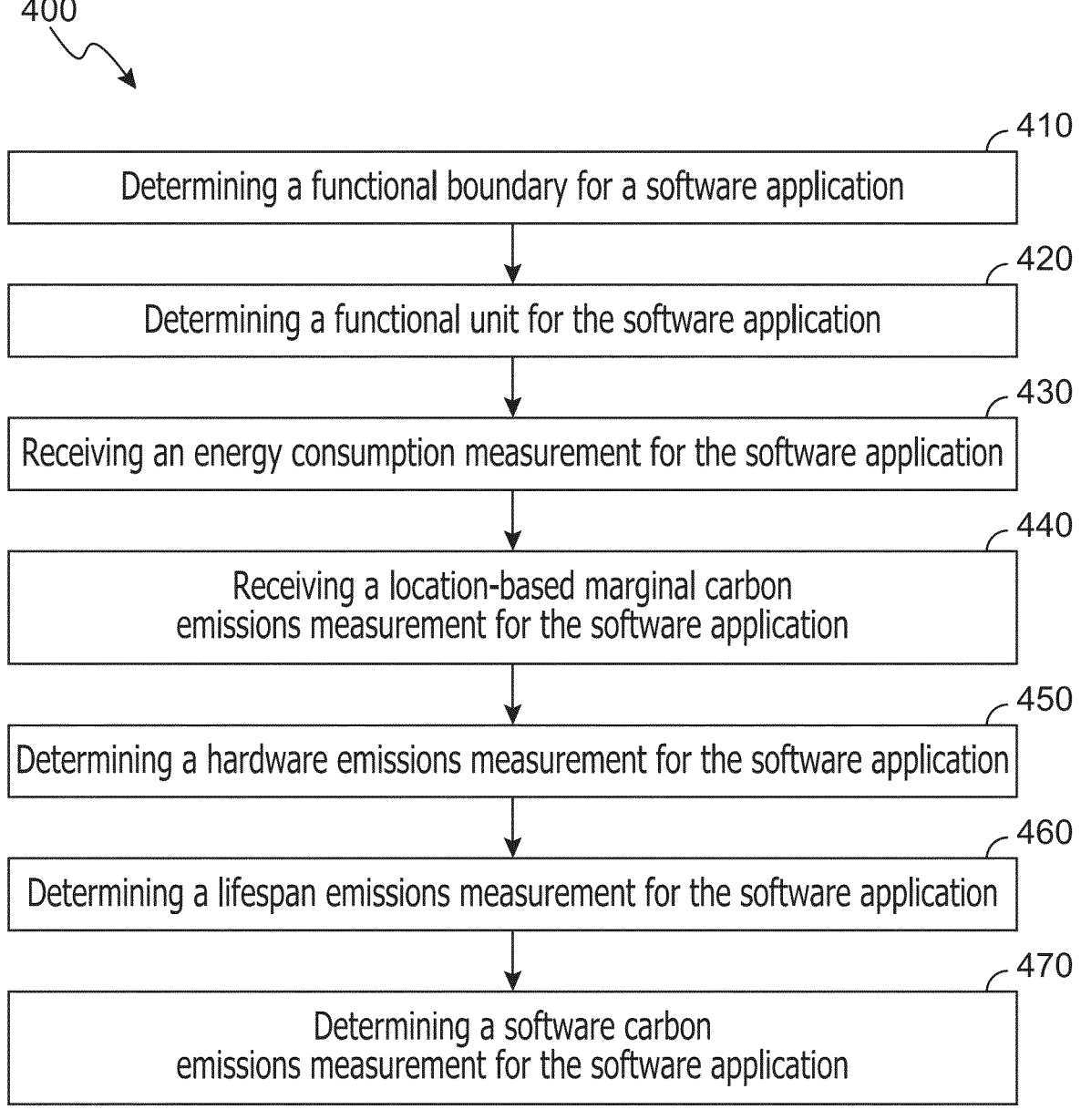

400

410
Determining a functional boundary for a software application

420
Determining a functional unit for the software application

430
Receiving an energy consumption measurement for the software application

440
Receiving a location-based marginal carbon emissions measurement for the software application 450
Determining a hardware emissions measurement for the software application 460
Determining a lifespan emissions measurement for the software application 470
Determining a software carbon emissions measurement for the software application

| Architecture | CPU Utilization | Elecrtic Use (in Watts) | Carbon Emmissions (tonne Co2eq) | #Charges for smart phones | Gasoline (in Gallons) |
|---|---|---|---|---|---|
| Bare Metal | 23% | 374 | 2.205 | 256,792 | 248 |
| VM | 26% | 373 | 2.202 | 256,409 | 248 |
| K8s | 24% | 375 | 2.214 | 257,824 | 250 |

SYSTEMS AND METHODS FOR DETERMINING SOFTWARE CARBON EMISSIONS

TECHNICAL FIELD

This disclosure relates generally to systems and methods for determining software carbon emissions.

BACKGROUND

Energy consumption is often monitored and being able to understand the input and output of energy can be beneficial in many technological areas. In addition to monitoring direct sources of energy consumption, software systems can generate indirect emissions through the electricity used by the hardware they operate on. Since these emissions are indirect, they are harder to measure. Being unable to identify indirect emissions can lead to inefficient systems. As such, there is a need for determining the—indirect—electricity usage and emissions of software applications to generate precise emissions inventories. Measuring emissions for a software system can enable informed choices about the tools, approaches, architectures, and services used.

BRIEF DESCRIPTION OF THE DRAWINGS

To facilitate further description of the embodiments, the following drawings are provided in which:

FIG. 4 illustrates a flowchart for a method, according to an embodiment;

Figure 6:
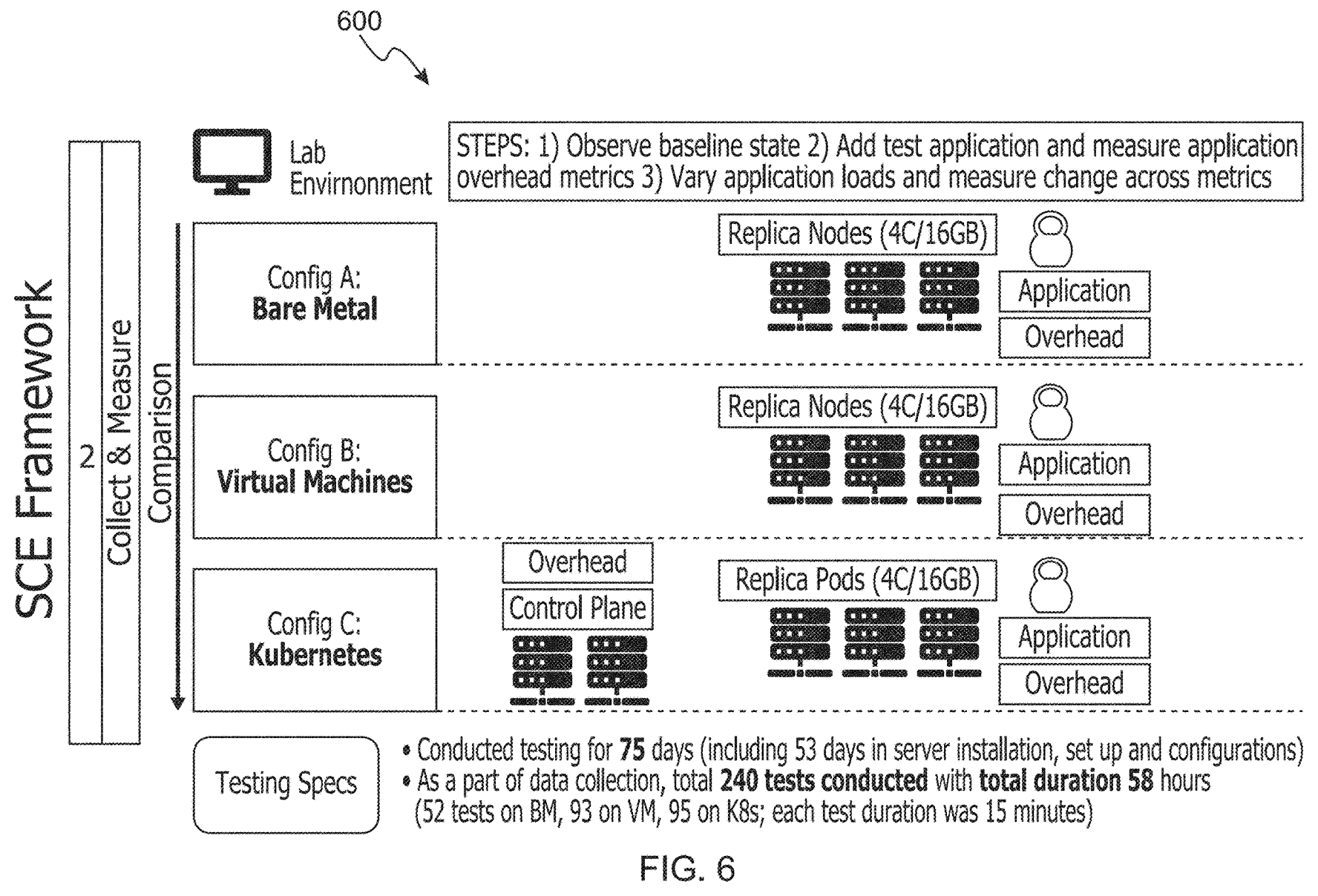

FIG. 6 illustrates an exemplary system process, according to an embodiment;

Figure 1:
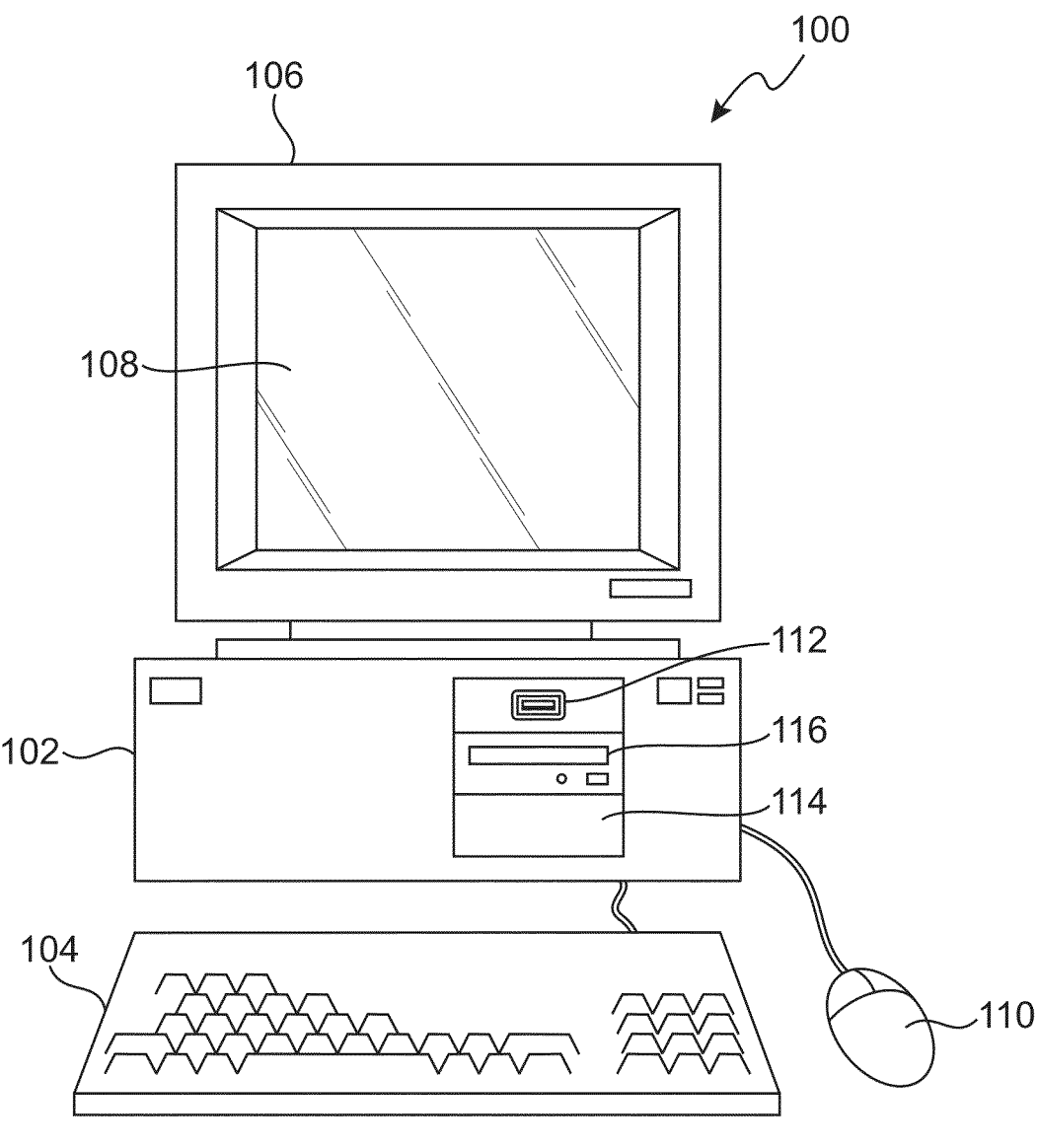
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 millisecond (ms), 10 ms, 50 ms, 100 ms, 500 ms, or 1 second(s).

DESCRIPTION OF EXAMPLES OF EMBODIMENTS

Figure 2:
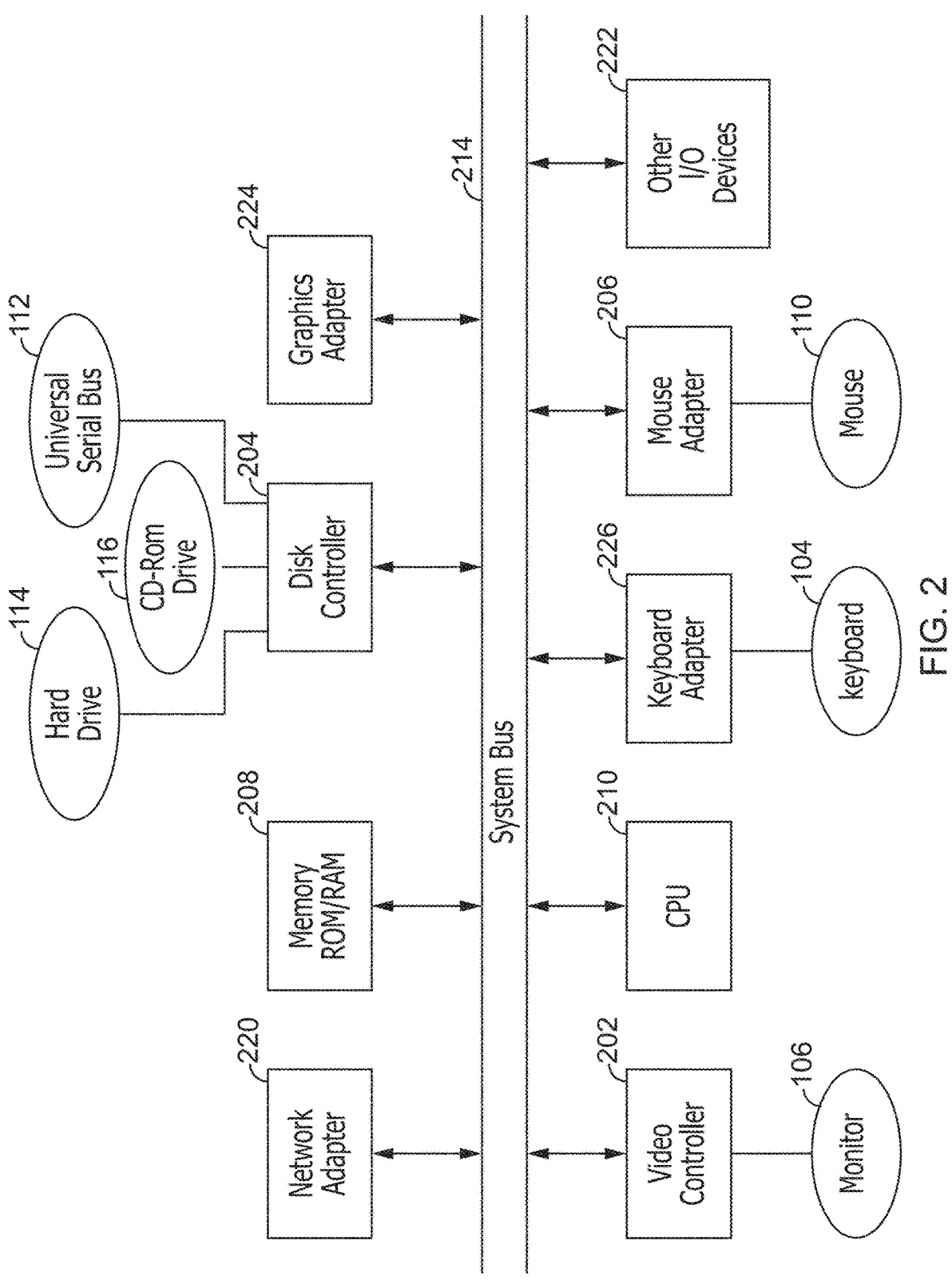
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module (s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
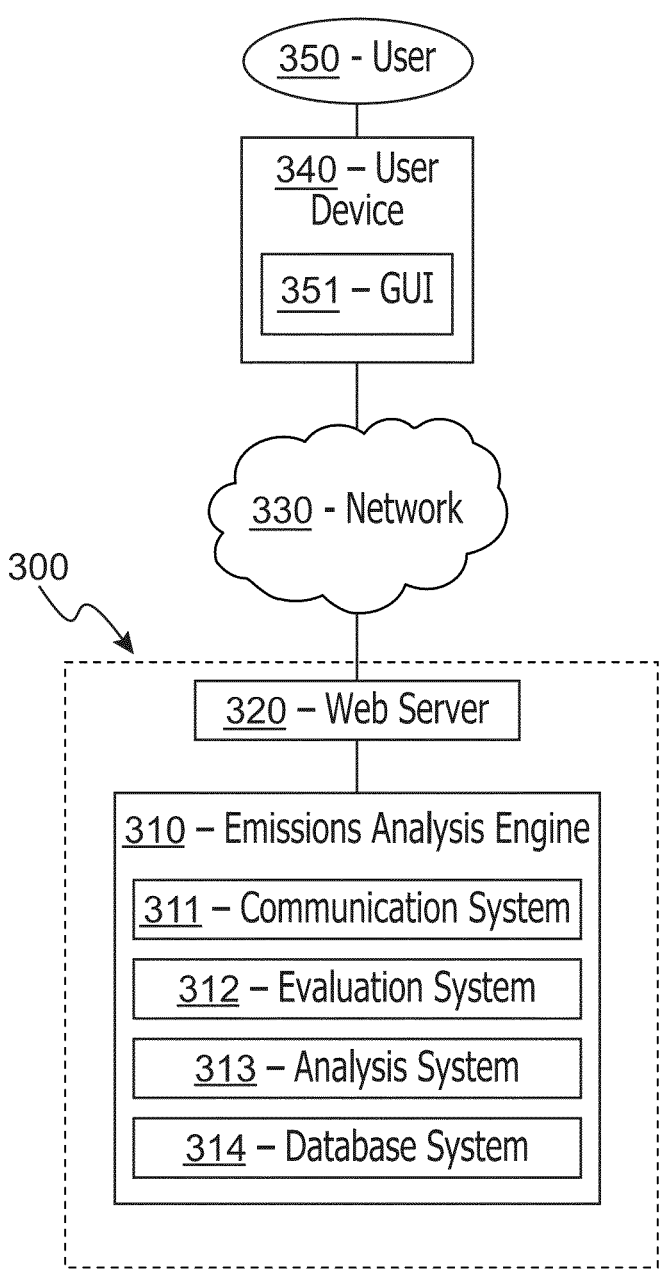
FIG. 3 illustrates a block diagram of a system that can be employed for determining software carbon emissions, according to an embodiment.

Turning ahead in the drawings, FIG. 3 illustrates a block diagram of a system 300 that can be employed for determining software carbon emissions, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an emissions analysis engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Emissions analysis engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host emissions analysis engine 310 and/or web server 320. Additional details regarding emissions analysis engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with emissions analysis engine 310, in addition to other suitable activities. In a number of embodiments, web server 320 can interface with emissions analysis engine 310 when a user (e.g., 350) is viewing system architecture components to determine software carbon emissions.

In some embodiments, an internal network that is not open to the public can be used for communications between emissions analysis engine 310 and web server 320 within system 300. Accordingly, in some embodiments, emissions analysis engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, emissions analysis engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to emissions analysis engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of emissions analysis engine 310 and/or web server 320. In a similar manner, the processors and/or the non-transitory computer-readable media can be local and/or remote to each other.

Meanwhile, in many embodiments, emissions analysis engine 310 and/or web server 320 also can be configured to communicate with one or more databases, such as a database system 314. The one or more databases can include emissions data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, emissions analysis engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, emissions analysis engine 310 can include a communication system 311, an evaluation system 312, an analysis system 313, and/or database system 314. In many embodiments, the systems of emissions analysis engine 310 can be modules of computing instructions (e.g., software modules) stored at non-transitory computer readable media that operate on one or more processors. In other embodiments, the systems of emissions analysis engine 310 can be implemented in hardware. Emissions analysis engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host emissions analysis engine 310 and/or web server 320. Additional details regarding emissions analysis engine 310 and the components thereof are described herein.

In many embodiments, user device 340 can comprise graphical user interface ("GUI") 351. In the same or different embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In some embodiments, GUI 351 can comprise a website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through network (e.g., Internet) 330 with user computers (e.g., 340). In certain embodiments, user devices 340 can be desktop computers, laptop computers, smart phones, tablet devices, and/or other endpoint devices. Web server 320 can host one or more websites. For example, web server 320 can host a website that allows users to analyze emissions of software applications, in addition to other suitable activities. In addition, compute can also run in multiple architecture setups, (refer to FIG. 8) such as bare metal, virtualized environment or containerized environment.

In many embodiments, emissions analysis engine 310, and/or web server 320 can be configured to communicate with one or more user devices 340. In some embodiments, user devices 340 also can be referred to as customer computers. In some embodiments, emissions analysis engine 310, and/or web server 320 can communicate or interface (e.g., interact) with one or more customer computers (such as user devices 340) through a network 330. Network 330 can be an intranet that is not open to the public. In further embodiments, network 330 can be a mesh network of individual systems. Accordingly, in many embodiments, facet analysis engine 310, and/or web server 320 (and/or the software used by such systems) can refer to a back end of system 300 operated by an operator and/or administrator of system 300, and user device 340 (and/or the software used by such systems) can refer to a front end of system 300 used by one or more users 350, respectively. In some embodiments, users 350 can also be referred to as customers, in which case, user device 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules', and/or user device 340 (FIG. 3). The processing module(s) can be similar or identical to the processing module(s) described above with respect to computer system 100 (FIG. 1).

In many embodiments, method 400 can comprise an activity 410 of determining a functional boundary for a software application. In some embodiments, determining a functional boundary for a software application can include determining one or more of containerization, virtualization, and orchestration for an implementation of the software application. For example, different software applications can be implemented using containerization, virtualization, and orchestration.

Figure 8:
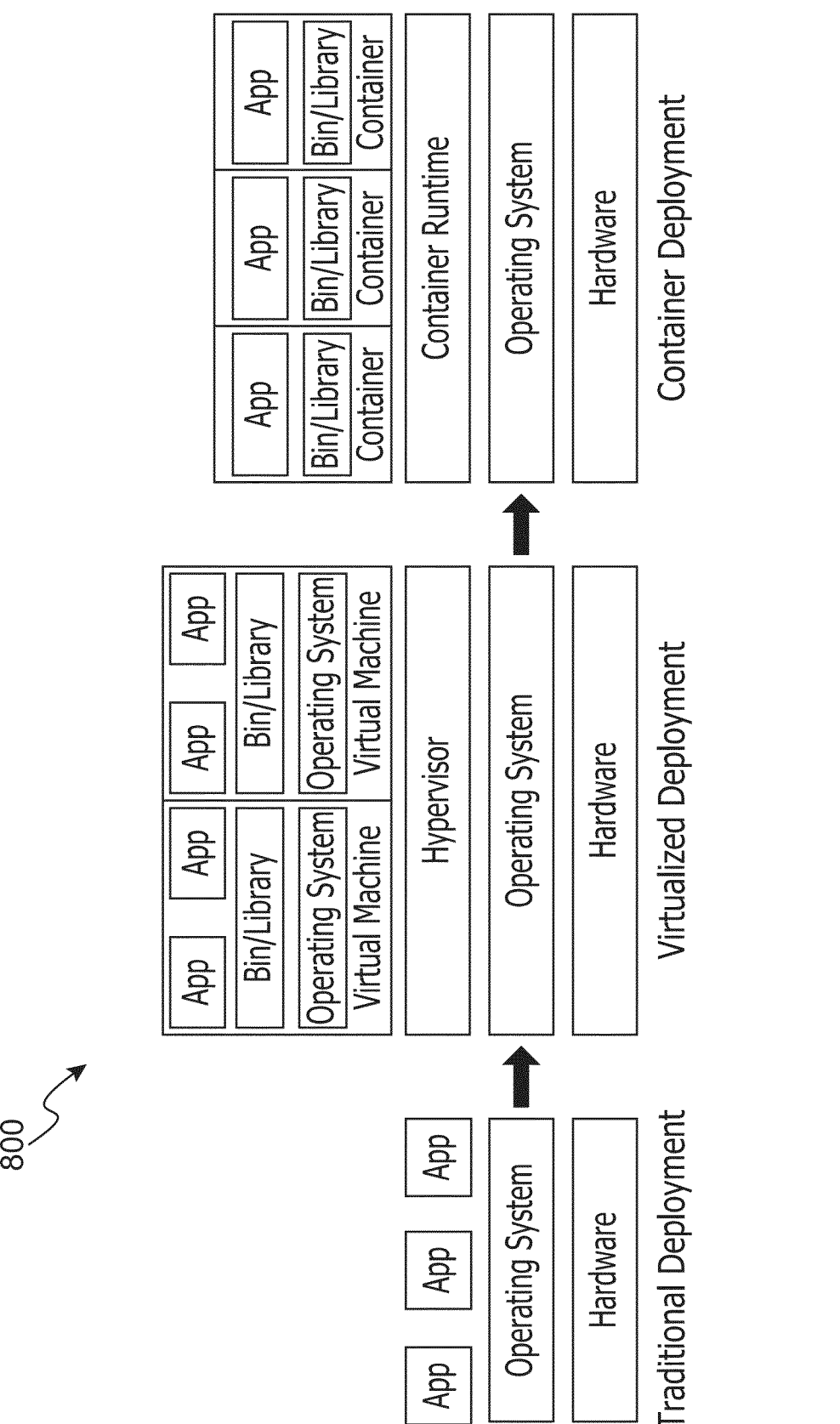
FIG. 8 illustrates an exemplary architecture 800, according to an embodiment.

Turning briefly to FIG. 8, an example architecture 800 is illustrated. The example architecture 800 illustrates different embodiments of functional boundaries of a software application. In some embodiments, the functional boundaries can include bare-metal, virtual machine, and/or Kubernetes components. In some embodiments, bare-metal refers to a physical computer system or server with no operating system or applications installed on it. It's the "bare" hardware upon which software can be installed. In the context of computing, bare-metal systems are often used to refer to environments where a single instance of an operating system runs directly on the hardware, without any virtualization layer. In some embodiments, a virtual machine (VM) is an emulation of a computer system that provides the functionality of a physical computer. VMs run on top of a physical machine using a hypervisor, which is software, firmware, or hardware that creates and runs virtual machines. Each VM includes a full copy of an operating system, one or more apps, and the virtualized hardware that the operating system sees. This allows for multiple VMs to run on a single physical machine, with each VM isolated from the others. In some embodiments, Kubernetes (K8s) is an open-source platform designed to automate deploying, scaling, and operating application containers. It doesn't run directly on bare-metal hardware or within a specific VM but orchestrates the deployment of containers across a cluster of machines. Containers can be thought of as a lightweight form of virtualization, providing a way to package an application and its dependencies into a container image that can run consistently on any infrastructure. Kubernetes manages these containers, which can run on VMs or directly on bare-metal servers, to ensure that the desired state of the application matches the actual state in the production environment.

The architecture 800 can also include containerization, virtualization technology, and/or orchestration. Containerization technology pertains to a method for packaging and executing applications along with their dependencies within isolated user spaces known as containers. Said containers afford consistent execution environments across diverse computing systems, thereby simplifying the processes of application development, deployment, and management. Each container encapsulates an application, its requisite libraries, configurations, and runtime components, which guarantees that the application operates uniformly, irrespective of variations in the underlying infrastructure. Virtualization technology relates to a process that facilitates the generation of multiple simulated instances or environments, termed virtual machines (VMs), on a solitary physical server or host system. These virtual instances are designed to function autonomously and are capable of executing distinct operating systems and applications. Virtualization serves to abstract the foundational hardware layer, which enhances resource utilization, isolation, and adaptability. This technology is prevalently employed within data centers to augment server efficiency and to consolidate management operations. Orchestration within the realm of information technology is defined as the automated coordination of various activities and procedures that are integral to the administration of intricate systems or applications. Specifically, within the domains of containerization or virtualization, orchestration utilities streamline the deployment, scaling, surveillance, and governance of containers or virtual machines. Orchestrators undertake responsibilities such as load distribution, service location, automatic scaling, and system restoration, thereby ensuring that applications are executed seamlessly and proficiently across distributed infrastructures. Notable orchestration utilities encompass Kubernetes for container management and VMware vSphere for virtual machine administration.

Each of the containerization, virtualization, and orchestration can result in different emissions outputs. In some embodiments, determining the functional boundary for the software application can include determining one or more components to analyze from at least one of the following: a data center, a server rack, a server, hardware, a mobile device, or a manufacturing process. For example, a social media software application can generate emissions through the server it is operating on, through the data center housing it, through the racks that had to be manufactured to hold the server it is operating on, through the energy usage and the emissions from manufacturing caused by the computer/phone you are accessing the application on, etc. Therefore it is useful to determine the boundaries of what will be analyzed to determine a carbon emissions measurement. Hardware and software boundaries can be determined by identifying how many units of hardware a Kubernetes or another orchestrator require, for example. It is also useful to determine the applications that also operate in order for the software application of interest to be executed.

In many embodiments, method 400 can comprise an activity 420 of determining a functional unit for the software application. In some embodiments, determining the functional unit for the software application can include determining an incremental unit from at least one of: adding a new user, one additional application programing interface (API) call, an individual machine learning job, wherein the incremental unit corresponds to the functional unit and identifies a function of increase for the software carbon emissions measurement. Determining what is the appropriate marginal increase to the software application can be beneficial to determine how many units of measurement are represented by a subsequent software carbon emissions measurement. For example, the functional unit can represent how much emissions are generated by each additional user of the software application, use of the entire software application, each additional API call, each individual ML jobs, etc.

In many embodiments, method 400 can comprise an activity 430 of receiving an energy consumption measurement for the software application. In some embodiments, receiving the energy consumption measurement for the software application can include collecting energy consumption measurements from tools such as Integrated DELL Remote Access Controller (iDRAC) (or comparable product such as Oracle iLOM or HPE iLO) or stand-alone Power Distribution Unit (PDU) sensor. In some embodiments, activity 430 can include modifying the energy consumption measurement based on a Central Processing Unit (CPU) usage measurement. Some hardware manufacturers provide internal power metrics. For example, iDRAC provides the energy being consumed by an appliance at any time. PDUs are another option which measure electricity entering the power cables of hardware from power outlets. Because multiple software applications can operate on the same piece of hardware, these energy consumption measurements are weighted by how much of the given piece of hardware the application uses. In some embodiments, CPU usage by the software application can be utilized to determine how many processors or cores on the hardware the software application is utilizing.

In many embodiments, method 400 can comprise an activity 440 of receiving a location-based marginal carbon emissions measurement for the software application. In some embodiments, receiving the location-based marginal carbon emissions measurement for the software application can include identifying a location of a power source for the software application (e.g., a global positioning system (GPS) coordinate), determining a fuel measurement for the power source (e.g., a type of fuel used to power the source), and determining the location-based marginal carbon emissions measurement for the software application based on the fuel measurement. The power source generating the electricity consumed is beneficial in the determination of the software carbon emissions measurement. For example, a software application plugged into a grid utilizing peat fuel would generate significantly more emissions than the same software application drawing power from a grid powered by geothermal energy. In some embodiments, activity 440 can include converting the fuel measurement for the power source. There are many sources to identify the emissions generated for each kWh used. Embodiments disclosed herein can utilize carbon profiler like the Environmental Protection Agency's Power Profiler and can convert the fuel measurements to specific units such as $CO_2$, $NO_x$, or another green house gas emissions (common unit of measure includes carbon dioxide equivalent or CO2e). In one example, the location of a data center housing hardware to identify the fuel mix provided by its local electric grid can be utilized to determine emissions.

In many embodiments, method 400 can comprise an activity 450 of determining a hardware emissions measurement for the software application. In some embodiments, determining the hardware emissions measurement for the software application can include identifying an equipment manufacturer for hardware executing the software application, and determining the hardware emissions measurement for the software application based on the equipment manufacturer. Some equipment manufacturers provide estimates for the emissions a piece of hardware is responsible for over its lifetime. This information accounts for the creation of the hardware, the transportation of it from construction to destination, the use of the hardware over the course of its life, and the disposal of the hardware after its useful life has ended. The hardware emissions measurement can utilize these estimates for the carbon emissions generated by the extraction, manufacturing, transportation, and disposal of the hardware the software application operates on.

In many embodiments, method 400 can comprise an activity 460 of determining a lifespan emissions measurement for the software application. In some embodiments, determining the lifespan emissions measurement for the software application can include determining a period of time to generate the software application. This measurement performs a similar calculation to that used to determine the emissions generated by the software application, but focuses on the time during which the software application is created. For example, this measurement corresponds to the time it takes a new software application to be created when determining the emissions. The lifespan emissions measurement is beneficial to determine whether to add to or improve an existing software application, or to build a newer, more efficient software application. It also helps better inform architectural considerations to achieve efficiency.

In many embodiments, method 400 can comprise an activity 470 of determining a software carbon emissions measurement for the software application. In some embodiments, the software carbon emissions measurement can be based at least on the functional boundary, the functional unit, the energy consumption measurement, the location-based marginal carbon emissions measurement, the hardware emissions measurement, or the lifespan emissions measurement. In some embodiments, determining the software carbon emissions measurement for the software application includes using an equation comprising:

$$SCE(U) = \left[ EI + (SF/L) \right] \times T$$

where U corresponds to the functional unit (e.g., additional user, API-calls, ML job), E corresponds to energy consumed by a piece of hardware system per unit of time, I corresponds to the location-based marginal carbon emissions measurement, S corresponds to a total embodied emissions (e.g., the sum of Life Cycle Assessment (LCA) or Product Carbon Footprint (PCF) emissions for all hardware components during their creation and disposal), F corresponds to a proportion of the total available resources of the hardware reserved for use by the software application, L corresponds to an expected lifespan (e.g., the anticipated time that the hardware will be in use), and T corresponds to a time that a given hardware is reserved for use by the software application. In some embodiments, LCAs/PCFs examine the environmental impacts throughout a product's life cycle (from raw materials acquisition to disposal)

There are generally two embodiments for a software application to generate emissions. The first is through direct energy consumption by the hardware on which the software application is based. A software application is hosted on a piece of hardware (such as a server or personal computer). That piece of hardware is plugged in and consumes electricity to function. The software application is therefore responsible for the energy consumed by the hardware. Thus, a software application is responsible for each unit of electricity used by the hardware, and each unit of electricity is originally generated by a power plant. Embodiments disclosed herein can determine how much emissions an electric utility generates for each unit of electricity enables the conversion of the amount of electricity the hardware consumes into emissions from the electric provider's power plants (e.g., green house gases). The second embodiment for emissions is the manufacturing of the hardware hosting the software application. The software application can correspond to the total emissions to create, transport, and dispose of the hardware. This can be weighted by the fraction of the hardware's CPU used by the software application divided by the hardware's total lifespan. This weighting accounts for the fact that multiple software applications can use the same hardware at once. CPU usage can provide what percentage of the hardware the software application is using at any given time. Both embodiments are weighted by the time the software application is hosted on the hardware (i.e., if a given piece of hardware has a useful lifespan of 7 years, but the software application is only on it for 1 year, the software application should not be responsible for the other 6 years of the hardware's life). This can correspond to the total emissions for which a software application is responsible.

Figure 5:
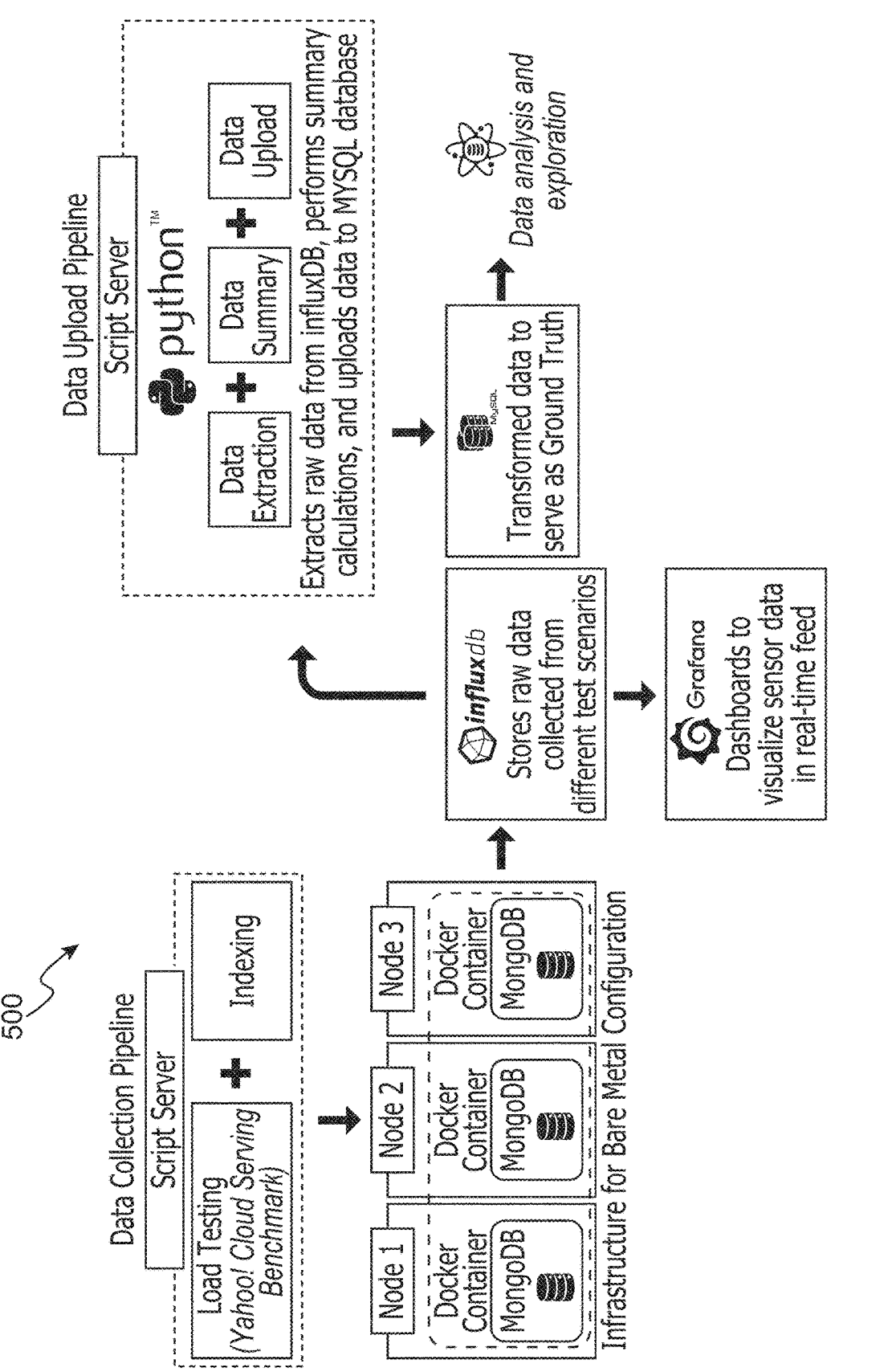
FIG. 5 illustrates an exemplary system architecture, according to an embodiment.

FIG. 5 illustrates an exemplary system architecture 500, according to an embodiment. The system architecture 500 is an illustration of one exemplary configuration where the metrics for the Mongo database are being published to an InfluxDB using Telegraph agents. The metrics are then pulled from the metrics database (InfluxDB) for the duration of the test and stored in a relational database (MySQL) along with the metadata for the load test. Load tests were designed in a way to emulate user loads in a real-world scenario.

In some embodiments, a load test is a type of performance test used to evaluate a system's ability to handle a variety of workloads. Often it is used to emulate high workloads or workloads that reach near max capacity at any point of the system. For example, a high workload may look like running multiple applications running simultaneously or sending multiple concurrent server requests leading to high traffic on the server. Whereas a low workload may look like downloading a report from an application where no part of the system is near maximum capacity.

The system architecture 500 can be adjusted to work with a variety of different endpoints and configurations. The functional unit for the system architecture 500 is the three-node replica set (4 CPU/16 GB). The example system architecture 500 of the illustration includes the following software and hardware components capable of implementing the SCE:

Software
Core Application
    MongoDB 6.0
    Ubuntu 20.04.2 LTS
    VMWare ESXi, 7.0 Update 3 Vsphere
    Kubernetes v1.21.5
Supporting Software
    Yahoo! Cloud Serving Benchmark (YCSB) Python bind-
        ing v0.15
    Docker for bare metal setup v20.10.18
    InfluxDB v1.8
    Grafana v7.5.15
Hardware
Servers
    5 Dell PowerEdge R650 servers
    Intel Xeon Gold 6354 3G
    18C/3 6T; 11.2GT/s
    39M Cache
    HT (205 W) DDR4-3200
    256 GB capacity
Disk & Network
    NIC—Broadcom BCM57508 2×100G QSFP PCIE
    Disk—(7) 446.63 GB SSDs. (2) are in a RAID-1 volume
        for OS and (5) are in a RAID-5 volume for data.
Sensors
    PDUs
    Temperature FIG. 6 illustrates an exemplary system process 600, according to an embodiment. The system process 600 utilizes metrics on power usage by 3 Dell PowerEdge R650 servers using the manufacturer's iDRAC platform and PDUs. The system process 600 can determine how much energy the servers used without the software application on them thus creating a baseline of the overhead. The system process 600 then executes the software application directly onto the servers in the bare metal configuration. The system process 600 can measure the difference in energy consumption from the baseline of each configuration. The system process 600 can then execute a load testing on the software application to simulate the demands put on a software application in the normal course of its operations.

The system process 600 can then execute a second process in identical fashion except for the addition of virtual machines (VMs) to the servers. This can include installing VMs onto the servers and measuring the energy consumption change from their addition. The system process 600 can then execute the software application on top of the VMs and continue analysis.

The system process 600 can repeat the process with the addition of the Kubernetes orchestrator to the bare metal servers before running the load tests.

The load tests are different combinations of indices utilized, operations performed per second, and Read and Write percentages which included (OLTP) and (OLAP) configurations. OLAP is optimized for complex data analysis and reporting, while OLTP is optimized for transactional processing and real-time updates. For example, 3000, 5000, 20000, 35000, 75000, 100000, 150000, and 250000 operations/sec tests can be performed. The Read and Write percentages can be 10% R/90% W, 20%/80%, 30%/70%, 50%/50%, 80%/20%, and 90%/10%.

Figure 7:
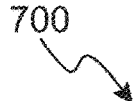
FIG. 7 illustrates an exemplary data relationship, according to an embodiment.

FIG. 7 illustrates an exemplary data relationship 700, according to an embodiment. The data relationship 700 illustrates differences between architectures with Read/Write: 80%/20%, index 1, and operations count: 5000. The data relationship 700 illustrates the differences between different architectures and can be useful to enable systems to reduce emissions.

Figure 9:
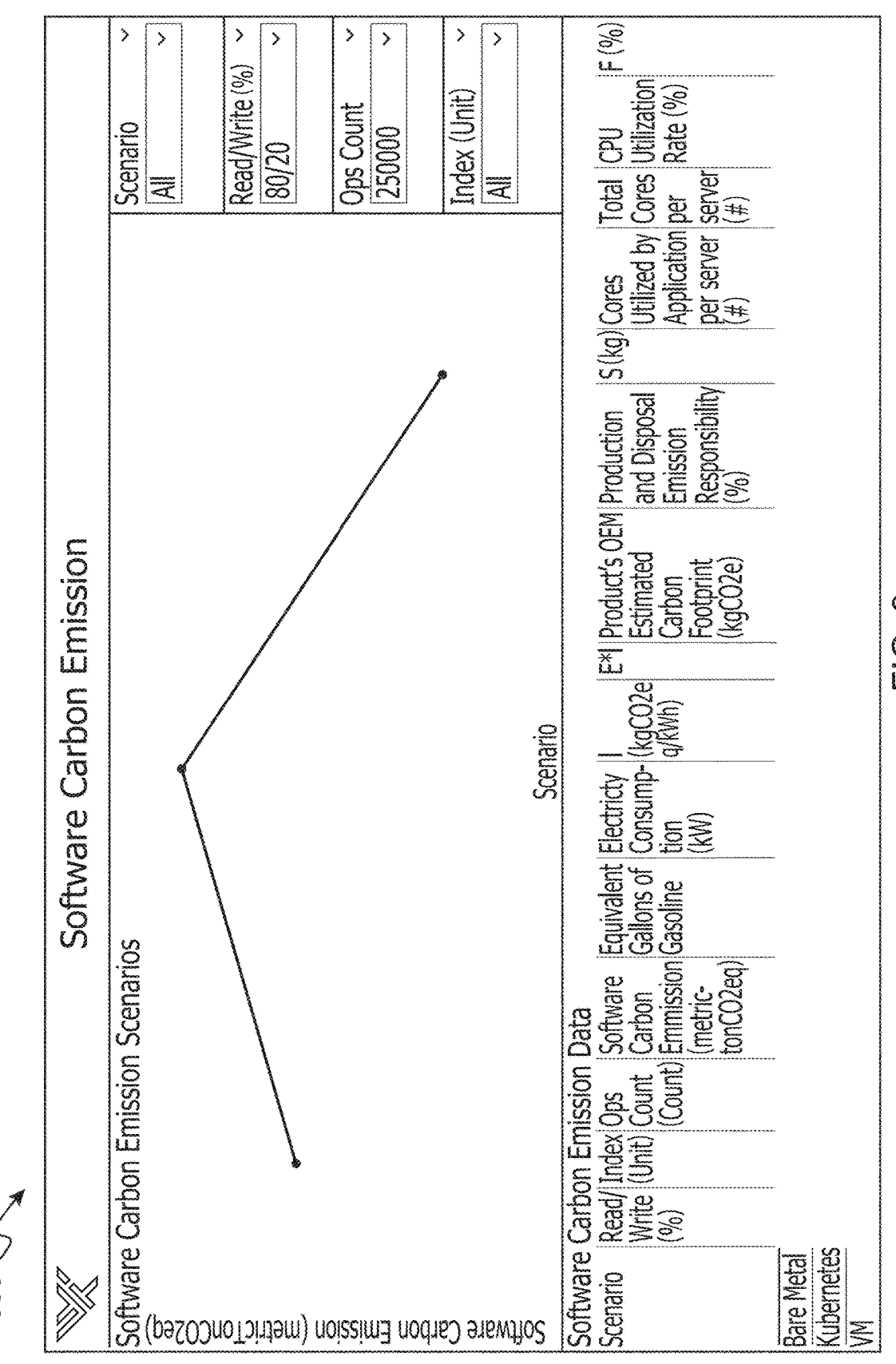
FIG. 9 illustrates an exemplary user interface 900, according to an embodiment.

FIG. 9 illustrates an example user interface 900. The user interface 900, as part of an analytical framework, is designed to facilitate the visualization of various configuration scenarios for a given application. This interface enables users to interactively explore and compare different architectural setups by presenting an aggregated list of pertinent metrics. These metrics may include, but are not limited to, the architecture of the setup, the percentage of read/write operations, the number of indexes, and the total count of operations performed.

The data analysis component of the framework leverages this collected data to perform a comprehensive comparative analysis, focusing on the environmental impact of the different setups. Specifically, the analysis quantifies the carbon emissions associated with electricity consumption and hardware usage for each configuration. By examining the variances in carbon emissions across different setups, the framework provides insights into how various architectural s contribute to the overall environmental footprint of the application.

Through this analytical process, the framework identifies which architectural metrics have the greatest influence on carbon emissions. By isolating and examining the effects of each metric, the user interface 900 aids in deconstructing the complex interplay between application architecture and its environmental impact. Consequently, this detailed analysis empowers the framework to offer informed recommendations on the architectural choices that are the least harmful to the environment.

Ultimately, the user interface 900 and the underlying method serve as a tool for stakeholders to make environmentally conscious decisions regarding application architecture, promoting the adoption of green technology practices and reducing the carbon footprint of IT operations.

Returning to FIG. 3, in several embodiments, evaluation system 312 can at least partially perform activity 410 (FIG. 4), 420 (FIG. 4), 430 (FIG. 4), and/or activity 440 (FIG. 4).

In a number of embodiments, analysis system 313 can at least partially perform activity 450 (FIG. 4), 460 (FIG. 4), and/or 470 (FIG. 4).

In a number of embodiments, web server 320 can at least partially perform method 400.

Although systems and methods for software carbon emissions have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:
one or more processors; and
one or more non-transitory computer-readable media storing computing instructions that, when run on the one or more processors, cause the one or more processors to perform operations comprising:
determining a functional boundary for a software application;
determining a functional unit (U) for the software application;
determining an expected lifespan (L) for the software application;
determining a time (T) that hardware is reserved for use by the software application;
determining a proportion (F) of total available resources of the hardware reserved for use by the software application;
collecting an energy consumption measurement (E) per unit of time for the software application from a Power Distribution Unit (PDU) sensor and modifying the energy consumption measurement based on a Central Processing Unit (CPU) usage measurement to weigh the energy consumption measurement by hardware utilization;
collecting a location-based marginal carbon emissions measurement (1) for the software application;
determining a total embodied emissions(S), comprising one or more of: a hardware emissions measurement for the software application, or
a lifespan emissions measurement for the software application; and
determining a software carbon emissions measurement for the software application using an equation comprising:

$$SCE(U) = [EI + (SF/L)] \times T.$$

2. The system of claim 1, wherein determining the functional boundary for the software application further comprises:
determining one or more of containerization, virtualization, or orchestration for an implementation of the software application; and
determining one or more components to analyze from one or more of: a data center, a server rack, a server, hardware, a mobile device, or a manufacturing process.

3. The system of claim 1, wherein determining the functional unit for the software application further comprises determining an incremental unit from one or more of: adding a new user, one additional application programing interface (API) call, or an individual machine learning job, wherein the incremental unit corresponds to the functional unit and identifies a function of increase for the software carbon emissions measurement.

4. The system of claim 1, wherein collecting the location-based marginal carbon emissions measurement for the software application further comprises:
identifying a location of a power source for the software application;
determining a fuel measurement for the power source; and
determining the location-based marginal carbon emissions measurement for the software application based on the fuel measurement.

5. The system of claim 4, further comprising converting the fuel measurement for the power source.

6. The system of claim 1, wherein determining the total embodied emissions(S) for the software application further comprises:
identifying an equipment manufacturer for hardware executing the software application; and
determining the hardware emissions measurement for the software application based on the equipment manufacturer.

7. The system of claim 1, wherein determining the total embodied emissions(S) for the software application further comprises determining a period of time to generate the software application.

8. The system of claim 1, wherein determining the functional unit (U) for the software application further comprises:
determining a unit of measurement represented by a subsequent carbon emissions measurement.

9. A method comprising:
determining a functional boundary for a software application;
determining a functional unit (U) for the software application;
determining an expected lifespan (L) for the software application;
determining a time (T) that hardware is reserved for use by the software application;
determining a proportion (F) of total available resources of the hardware reserved for use by the software application;
collecting an energy consumption measurement (E) per unit of time for the software application from a Power Distribution Unit (PDU) sensor and modifying the energy consumption measurement based on a Central Processing Unit (CPU) usage measurement to weigh the energy consumption measurement by hardware utilization;
collecting a location-based marginal carbon emissions measurement (1) for the software application;
determining a total embodied emissions(S), comprising one or more of: a hardware emissions measurement for the software application, or
a lifespan emissions measurement for the software application; and
determining a software carbon emissions measurement for the software application using an equation comprising:

$$SCE(U) = [EI + (SF/L)] \times T.$$

10. The method of claim 9, wherein determining the functional boundary for the software application further comprises:

determining one or more of containerization, virtualization, or orchestration for an implementation of the software application; and determining one or more components to analyze from one or more of: a data center, a server rack, a server, hardware, a mobile device, or a manufacturing process.

11. The method of claim 9, wherein determining the functional unit for the software application further comprises determining an incremental unit from one or more of: adding a new user, one additional application programing interface (API) call, or an individual machine learning job, wherein the incremental unit corresponds to the functional unit and identifies a function of increase for the software carbon emissions measurement.

12. The method of claim 9, wherein collecting the location-based marginal carbon emissions measurement for the software application further comprises:

identifying a location of a power source for the software application;

determining a fuel measurement for the power source; and determining the location-based marginal carbon emissions measurement for the software application based on the fuel measurement.

13. The method of claim 12, further comprising converting the fuel measurement for the power source.

14. The method of claim 9, wherein determining the total embodied emissions(S) for the software application further comprises:

identifying an equipment manufacturer for hardware executing the software application; and determining the hardware emissions measurement for the software application based on the equipment manufacturer.

15. The method of claim 9, wherein determining the total embodied emissions(S) for the software application further comprises determining a period of time to generate the software application.

16. The method of claim 9, wherein determining the functional unit (U) for the software application further comprises:

determining a unit of measurement represented by a subsequent carbon emissions measurement.

* * * * *